United States Patent
Li et al.

(10) Patent No.: US 11,240,714 B2
(45) Date of Patent: Feb. 1, 2022

(54) WIRELESS COMMUNICATION NODE SCANNING AND ASSOCIATION

(71) Applicant: ZTE Corporation, Guangdong (CN)

(72) Inventors: Nan Li, Guangdong (CN); Kaiying Lv, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/826,143

(22) Filed: Mar. 20, 2020

(65) Prior Publication Data

US 2020/0260343 A1 Aug. 13, 2020

Related U.S. Application Data (63) Continuation of application No. PCT/CN2017/102955, filed on Sep. 22, 2017.

(51) Int. Cl.

| | |
|---|---|
| *H04W 36/00* | (2009.01) |
| *H04W 36/08* | (2009.01) |
| *H04W 36/30* | (2009.01) |
| *H04W 52/02* | (2009.01) |
| *H04W 84/12* | (2009.01) |
| *H04W 72/04* | (2009.01) |

(52) U.S. Cl.
CPC ... *H04W 36/0061* (2013.01); *H04W 36/0072* (2013.01); *H04W 36/08* (2013.01); *H04W 36/30* (2013.01); *H04W 52/028* (2013.01); *H04W 52/0216* (2013.01); *H04W 52/0229* (2013.01); *H04W 72/042* (2013.01); *H04W 84/12* (2013.01)

(58) Field of Classification Search
None
See application file for complete search history.

(56) References Cited

U.S. PATENT DOCUMENTS

| 10,440,619 | B2 * | 10/2019 | Taneja | H04W 36/0044 |
|---|---|---|---|---|
| 2009/0227255 | A1 | 9/2009 | Thakare | |
| 2014/0003399 | A1 * | 1/2014 | Liu | H04W 52/02 370/336 |
| 2014/0112229 | A1 | 4/2014 | Merlin et al. | |
| 2014/0321415 | A1 | 10/2014 | You et al. | |

(Continued)

FOREIGN PATENT DOCUMENTS

| CN | 101483894 A | 7/2009 |
|---|---|---|
| CN | 101960910 A | 1/2011 |

(Continued)

OTHER PUBLICATIONS

Extended European Search Report for European Patent Application No. 17925718.3, dated Jan. 25, 2021.

(Continued)

*Primary Examiner* — Jutai Kao
(74) *Attorney, Agent, or Firm* — Perkins Coie LLP (57) ABSTRACT

Systems, devices, and techniques are described for communication node scanning and association in a wireless communication network. An illustrative method includes receiving, via a first channel, identifying information that identify a plurality of communication nodes that are configured to communicate via at least a second channel. The illustrative method further includes initiating communication, via at least the second channel, with a communication node based, at least in part, on the identifying information.

20 Claims, 5 Drawing Sheets

(56) References Cited

U.S. PATENT DOCUMENTS

| | | |
|---|---|---|
| 2015/0282056 A1 | 10/2015 | Cherian et al. |
| 2016/0057605 A1 | 2/2016 | Shellhammer et al. |
| 2016/0374019 A1 | 12/2016 | Park et al. |
| 2018/0184435 A1* | 6/2018 | Cariou .............. H04W 36/0061 |
| 2018/0376399 A1* | 12/2018 | Zhou ..................... H04W 36/32 |
| 2020/0137682 A1* | 4/2020 | Jia ..................... H04W 36/0079 |
| 2020/0178178 A1* | 6/2020 | Huang ................ H04W 52/028 |
| 2020/0196239 A1* | 6/2020 | Wang ..................... H04W 68/02 |
| 2020/0245238 A1* | 7/2020 | Kim .................. H04W 52/0229 |

FOREIGN PATENT DOCUMENTS

| | | |
|---|---|---|
| CN | 102300293 A | 12/2011 |
| CN | 102625427 A | 8/2012 |
| CN | 104469775 A | 3/2015 |
| CN | 104602324 A | 5/2015 |
| CN | 106165495 A | 11/2016 |
| CN | 106171012 A | 11/2016 |
| JP | 2008-042939 A | 2/2008 |
| WO | 2005011134 A2 | 2/2005 |
| WO | 2016160306 A1 | 10/2016 |

OTHER PUBLICATIONS

Office Action for Chinese Patent Application No. 201780095032.6, dated Mar. 1, 2021.

International Search Report and Written Opinion dated Jun. 22, 2018 for International Application No. PCT/CN2017/102955, filed on Sep. 22, 2017 (7 pages).

Chu, Liwen, "WUR MAC Consideration," IEEE 802.11-16/1460r0, IEEE mentor, Nov. 2016.

Office Action for Japanese Patent Application No. 2020-516523, dated Aug. 17, 2021, with English summary (5 pages).

Notice of Grant for Chinese Patent Application No. 201780095032.6, dated Aug. 17, 2021 (4 pages).

\* cited by examiner

WIRELESS COMMUNICATION NODE SCANNING AND ASSOCIATION

CROSS REFERENCE TO RELATED APPLICATIONS

This patent document is a continuation of and claims benefit of priority to International Patent Application No. PCT/CN2017/102955, filed on Sep. 22, 2017. The entire content of the before-mentioned patent application is incorporated by reference as part of the disclosure of this application.

TECHNICAL FIELD

This application relates to systems, devices, and techniques for wireless communications.

BACKGROUND

A wireless communication network, such as a wireless local area network (WLAN), facilitates wireless communications among various wireless communication nodes. A wireless communication node (e.g., a wireless router, wireless adaptor, wireless repeater, mobile station, Internet of Things (IoT) device, or the like) can be an access point (AP) or a non-AP station (STA). In some embodiments, the wireless communication network and the wireless communication nodes are designed to allow certain wireless communication nodes (e.g., STAs) to enter a power-saving mode (e.g., an "idle" or "sleep" mode). In the power-saving mode, a main radio of the wireless communication node is turned off and a low-power wake-up radio of the wireless communication node is turned on for monitoring certain wake-up channel, in order to conserve power at the wireless communication node.

SUMMARY

This document describes technologies, among others, for scanning and associating wireless communication nodes using one or more channels in a wireless communication network.

In some embodiments, a method for wireless communication is provided. The method includes receiving, via a first channel associated with a first source communication node, at least one first message including one or more identifiers that identify a first plurality of source communication nodes configured to communicate with a recipient communication node via at least a second channel. The first plurality of source communication nodes includes the first source communication node. The method includes initiating communication, via at least a third channel, with a second source communication node based, at least in part, on the at least one first message received via the first channel.

In some embodiments, the at least one first message indicates a fourth channel on which the first source communication node is configured to transmit at least one second message to the recipient communication node. In some embodiments, the fourth channel is located within a bandwidth of the first channel. In some embodiments, the first channel is a primary channel of the first source communication node and the fourth channel is located within a bandwidth of a secondary channel of the first source communication node. In some embodiments, the method further includes receiving, via the fourth channel, the at least one second message, wherein the at least one second message includes one or more identifiers that identify a second plurality of source communication nodes configured to communicate with the recipient communication node via at least the third channel. In some embodiments, the second source communication node is included within the first or the second plurality of source communication nodes.

In some embodiments, the at least one first message is received by a first radio component of the recipient communication node and the at least one second message is received by a second radio component of the recipient communication node. In some embodiments, the second radio component consumes less power than the first radio component. In some embodiments, the first radio component is turned off when the second radio component receives the at least one second message. In some embodiments, initiating communication with the second source communication node comprises scanning at least the third channel using the first radio component.

In some embodiments, the method further includes receiving, via the fourth channel, at least one third message transmitted from a third source communication node. In some embodiments, the method further includes filtering out the at least one third message based, at least in part, on the at least one first message or the at least one second message. In some embodiments, the third source communication node is included within the first plurality of source communication nodes. In some embodiments, the third source communication node and the second source communication node correspond to a same source communication node. In some embodiments, the second channel and the third channel correspond to a same channel.

In some embodiments, the method further comprises receiving, via the third channel, at least one third message transmitted from the second source communication node, wherein the at least one third message includes one or more identifiers that identify the second source communication node. In some embodiments, initiating communication with the second source communication node is further based, at least in part, on the at least one third message.

In some embodiments, another method for wireless communication is provided. The method includes transmitting, via a first channel associated with a first source communication node, to a recipient communication node, at least one message including one or more identifiers that identify a plurality of source communication nodes configured to communicate with the recipient communication node via at least a second channel, wherein the plurality of source communication nodes includes the first source communication node.

In some embodiments, the first channel and the second channel correspond to a same channel. In some embodiments, the first channel corresponds to a wake-up channel, a primary channel, or a secondary channel associated with the first source communication node. In some embodiments, the second channel corresponds to a primary channel associated with the second source communication node. In some embodiments, the one or more identifiers include at least one of a basic service set (BSS) color, association ID (AID), extended service set identifier (ESSID), service set identifier (SSID), compressed ESSID, compressed SSID, or extended service set (ESS) color.

In some embodiments, a computing device is configured to carry out any one of the above methods. In some embodiments, a non-transitory computer-readable medium stores computer-executable instructions for carrying out any one of the above methods.

BRIEF DESCRIPTION OF THE DRAWINGS

Like reference symbols in the various drawings indicate like elements.

DETAILED DESCRIPTION

The technology and examples of implementations in this document can be used to improve the timelessness, efficiency, and efficacy of process(es) for waking up a wireless communication node in power-saving mode. The term "exemplary" is used to mean "an example of" and, unless otherwise stated, does not imply an ideal or preferred embodiment. Section headings are used to facilitate understanding and do not limit scope of the described techniques to the corresponding sections.

Power consumption has been a concern since the advent of wireless devices. Battery consumption by a main radio component of a wireless device, for example, may be significant and can impact user experience of the device. Recently, various Internet of Things (IoT) devices (e.g., sensors equipped with a wireless module) are increasingly becoming wirelessly connected. IoT devices can be applied in a number of areas, such as intelligent transportation, environmental protection, public security, smart home, industrial monitoring, personal health, etc. In many cases, IoT devices are battery powered and/or installed at locations where frequent maintenance can be difficult. Accordingly, maximizing battery life or otherwise conserving power continue to be an important aspect in next generation systems and wireless communication techniques.

As discussed above, a wireless communication node can be equipped with an low-power wake-up radio for continuously monitoring some wake-up channel and activating the main radio of the node on demand (e.g., to receive incoming communication). The main radio, which consumes significantly more power than the wake-up radio, is turned off when the wake-up radio is on, for purposes of power saving. This operation can correspond to a power-saving mode of the wireless communication node. The node can wake up and turn on its main radio autonomously if it needs to transmit data. After the data transmission, the node can re-enter power-saving mode.

Typically, if a node in power-saving mode (e.g., with main radio turned off) moves outside the coverage of its associated AP, the node will not be able to find its associated AP when it wakes up autonomously. The node will perform network scanning using its main radio following scanning procedures known to those skilled in the art.

Additionally, in some cases (e.g., the received signal strength (RSS) of its currently associated AP (e.g., serving AP) drops below a threshold), it may be desirable or necessary for a node to associate itself with another AP. Typically, in order to associate with another AP, the node will turn on its main radio and perform network scanning following scanning procedures known to those skilled in the art.

Typically, an STA can use two types of scanning procedures: passive scanning and active scanning. For passive scanning, an STA listens to each and every accessible channel for a certain period of time. For active scanning, an STA sends Probe Request frames and processes any received Probe Response frames on each and every accessible channel. After scanning all accessible channels, the STA will determine an AP to associate with for performing future communications. Both types of the scanning procedures can be inefficient, time-consuming, and/or power-consuming.

The presently disclosed technology for scanning and associating wireless communication nodes address the drawbacks discussed above, and can be used, among other things, to improve the timelessness, efficiency, and efficacy of process(es) for waking up a wireless communication node in power-saving mode.

In this patent document, the specifics in the described examples should not be construed as limitation on the scope of the disclosed technology or what may be claimed, but rather as descriptions of features that may or may not be specific to particular embodiments of specific disclosed technology. Certain features that are described in this document are in the context of separate embodiments may also be implemented in combination in a single embodiment. Conversely, features that are described in the context of a single embodiment may also be implemented in multiple embodiments separately or in any suitable combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this disclosure should not be understood as requiring such separation in all embodiments.

Overview of Typical Communication Network Environment

Figure 1:
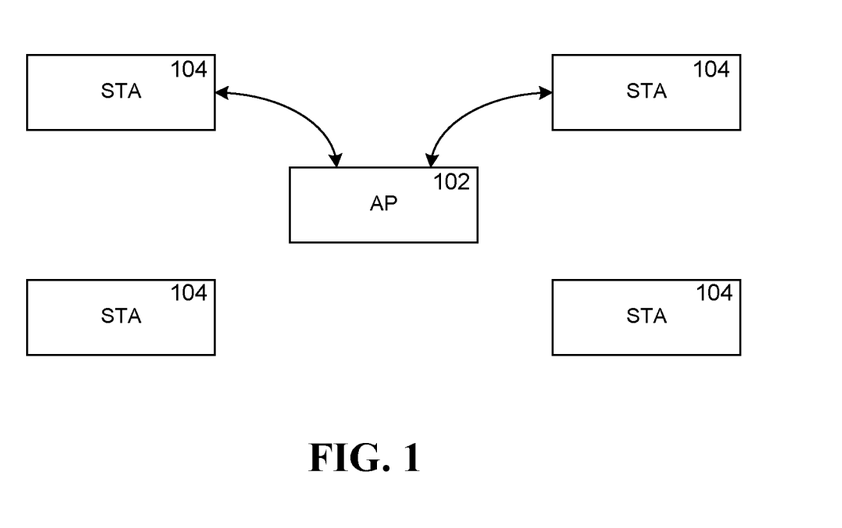
FIG. 1 illustrates exemplary relationships between an AP and one or more STAs.

As discussed above, a wireless communication network can include AP and STA nodes. In some embodiments, a node can be both an AP and an STA. FIG. 1 illustrates exemplary relationships between an AP and one or more STAs. As illustrated, an AP 102 can correspond to a basic equipment in a wireless local area network (WLAN), and STA(s) 104 can establish wireless communications with the AP 102 through a predetermined association or registration procedure, and thereafter communicate with the AP 102 for data transmission. The AP 102 together with all associated STAs establish a Basic Service Set (BSS). In some types of networks (e.g., ad-hoc networks), an AP may not be present in the network, and STAs can communicate directly with one another. In these types of networks, a group of communicatively inter-connected STAs establish an independent BSS (IBSS).

Figure 2:
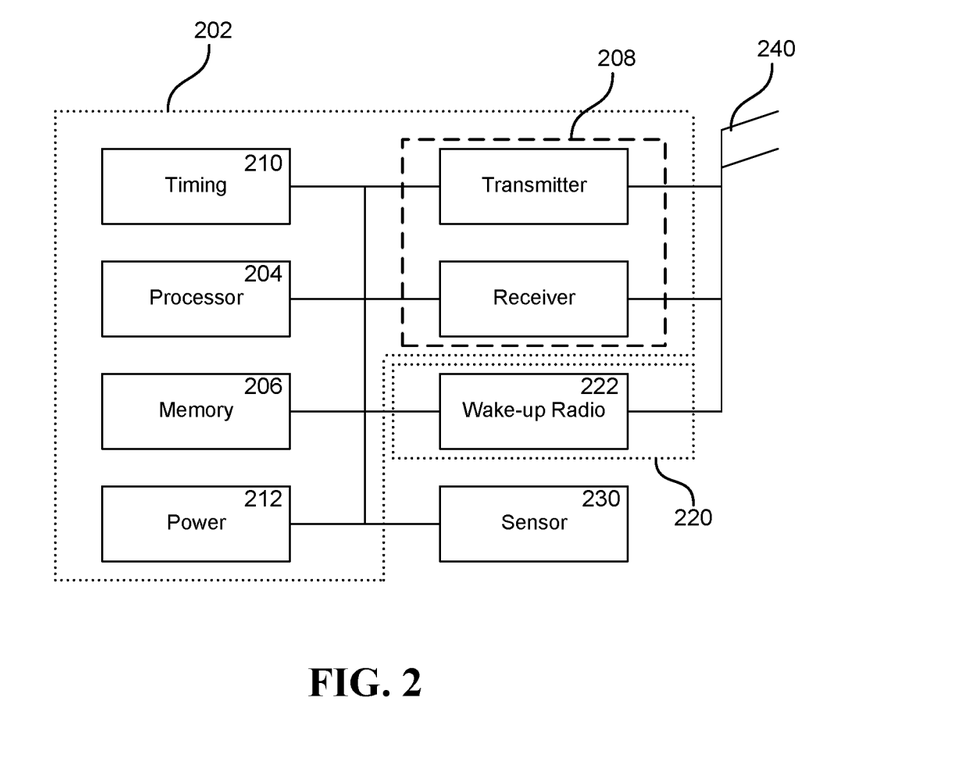
FIG. 2 illustrates a block diagram of at least a portion of an exemplary STA, in accordance with some embodiments of the presently disclosed technology.

FIG. 2 illustrates a block diagram of at least a portion of an exemplary STA, in accordance with some embodiments of the presently disclosed technology. As illustrated, an exemplary STA (e.g., an IoT device) includes a main wireless module (generally referred to as main radio 202 hereinafter). The main radio 202 can include one or more processors 204, memory 206, transmitter and receiver 208, timing module 210, power module 212, and/or other elements.

The exemplary STA also includes an assistant wireless module 220, which includes at least a wake-up radio 222 for monitoring wake-up signals from one or more APs. The wake-up radio 222 can be configured to perform signal receiving and decoding, information processing and/or relevant function triggering. The assistant wireless module 220 can be configured to assist the main radio 202 in the application of certain controlling and managing function(s). In some embodiments, the exemplary STA can further include one or more sensors 230, one or more antennas 240, and/or other components.

Figure 3:
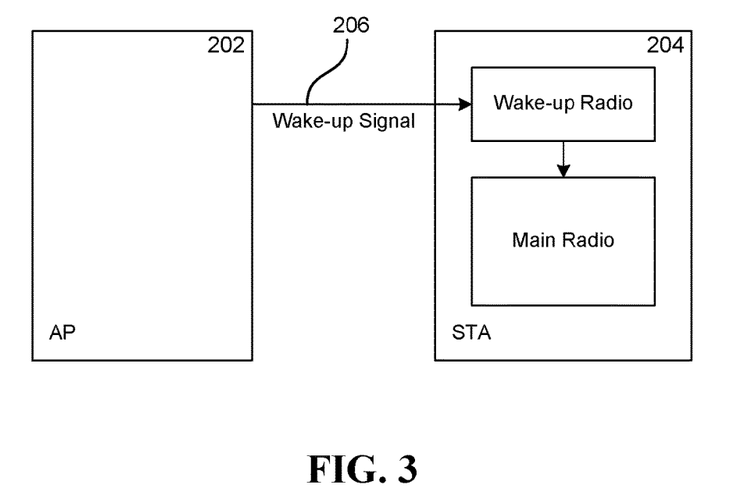
FIG. 3 shows an example of a typical waking-up process.

FIG. 3 shows an example of a typical waking-up process involving an AP 202 and an STA 204. When certain predefined conditions are satisfied (e.g., the STA 204 has been in the absence of traffic for a certain period of time), the STA 204 initiates a procedure (not shown in FIG. 3) to negotiate power-saving mode parameters with its associated AP 202, and then the STA 204 enters a power-saving mode by turning off its main radio and turning on its wake-up radio. The STA 204 can be woken up by a wake-up signal 206 transmitted by the AP 202 if any data communication is needed. Similar setup and arrangements can be applied to an AP (not shown in FIG. 3). For example, an assistant wireless module including least a wake-up radio can be added to an AP. When certain predefined conditions are satisfied, the AP can enter a power-saving mode. If an associated STA has data to be transmitted, it can first transmit a wake-up signal for waking up the AP.

Figure 4:
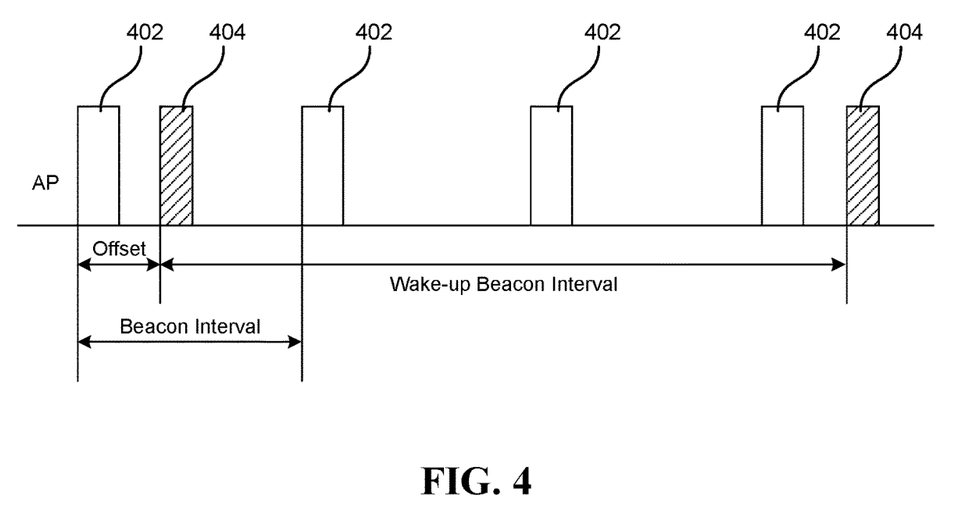
FIG. 4 shows an example of typical Beacon and wake-up Beacon transmission.

FIG. 4 shows an example of typical Beacon and wake-up Beacon transmission. As shown in FIG. 4, in a typically BSS implementation, an AP functions as the timing master for any timed functions between the AP and an associated STA. The AP transmits Beacon frames 402 periodically. Each Beacon frame 402 includes a value of a current timestamp to synchronize the timer(s) of the STA(s) in the BSS. If any STA enters power-saving mode and monitors wake-up signals on a predefined channel, the AP can send another type of frame (e.g., wake-up Beacon 404) carrying timing information on this predefined channel to help the STA in power-saving mode synchronize.

Although various aspects of the presently disclosed technology are described herein in the context of a WLAN environment, it is understood that the technology may be practiced in any communication environment in which multiple nodes, at least one of which including a main wireless module and an assistant wireless module, can communicate with each other.

Exemplary Actions of an AP

In some embodiments, an AP supporting enhanced wake-up process(es) as disclosed herein can transmit to associated or unassociated STA(s) information that identify, or otherwise facilitate the scanning of, a set of potential serving APs. Illustratively, the information can include one or more wake-up parameters sets. The AP can use a Beacon frame, Probe Response frame, Association Response frame, and/or certain wake-up frame(s) (e.g., wake-up Beacon) to carry the wake-up parameters set(s), and transmit to one or more STAs. In some embodiments, the AP can transmit wake-up parameter update sets via one or more of these frames to add, delete, change, or otherwise update any information (e.g., identifiers of potential serving APs) included in previously transmitted wake-up parameters set(s).

Illustratively, the wake-up parameters set(s) can include a wake-up parameters set of the transmitting AP. In some embodiments, the wake-up parameter set(s) can also include wake-up parameters set(s) of other AP(s) such as recommended AP(s), neighboring AP(s), and/or APs within a same virtual BSS group. A wake-up parameters set of a particular AP can include the following parameters: location of the wake-up channel(s) of the particular AP, location of the primary channel of the particular AP, identifier(s) (e.g., a distinct BSS color value used to identify the particular AP or a specific Association ID (AID) value used to identify the particular AP) that identify the transmitter of the particular AP's wake-up frames, and/or identifier(s) that identify a virtual BSS group to which the particular AP belongs.

Figure 5:
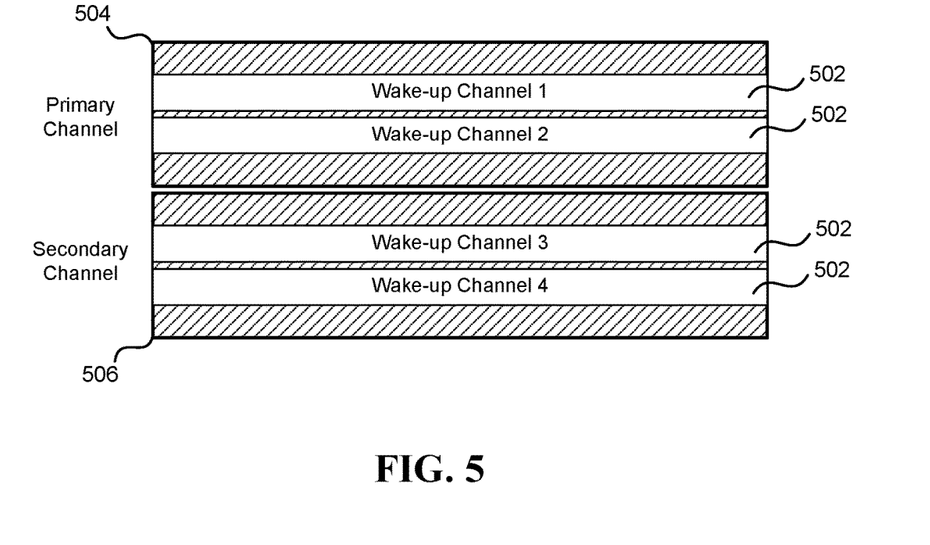
FIG. 5 shows an example of the location of wake-up channels within an AP's primary channel and/or secondary channel(s), in accordance with some embodiments of the presently disclosed technology.

In some embodiments, a wake-up channel is a channel used by an AP to send wake-up frames. An AP can determine or be assigned to use one or more wake-up channels. For example, the wake-up channel(s) can be predefined in the wireless communication system, determined and informed by the AP, or otherwise provided by the wireless communication system. FIG. 5 shows an example of the location of wake-up channels within an AP's primary channel and/or secondary channel(s), in accordance with some embodiments of the presently disclosed technology. As illustrated, individual wake-up channels 502 of the AP are located within a corresponding primary channel 504 or secondary channel 506 of the AP, and the bandwidth of a wake-up channel 502 is narrower (or smaller) than that of a corresponding primary channel 504 or secondary channel 506 of the AP. In some embodiments, the location of wake-up channel(s) is outside of the bandwidth of an AP's primary channel and secondary channel(s). For example, an AP's primary channel and secondary channel(s) can all use a 2.4 GHz band while at least one wake-up channel of the AP uses a 5 GHz band. In further embodiments, the bandwidth of an AP's primary or secondary channel can partially overlap with the bandwidth of at least one wake-up channel of the AP. The AP can use different channels to transmit different type of frames. For example, the AP can transmit a Beacon frame, Probe Response frame, and/or Association Response frame via a primary channel or a secondary channel, and transmit a wake-up frame (e.g., a wake-up Beacon) via a wake-up channel.

In some embodiments, a virtual BSS group corresponds to a set of one or more BSSs that, for example, can a provide a logical or physical contiguous coverage region to one or more STAs. The virtual BSS group may be a paging group in which an STA can be woken up by any BSS of the group. A virtual BSS group identifier can therefore be an a page group ID. The virtual BSS group may include interconnected BSSs that appear as a single BSS to the logical link control (LLC) layer at any STA associated with one of the interconnected BSSs. For example, a virtual BSS group can correspond to an extended service set (ESS). All the BSSs in a single ESS can be associated with a common service set identifier (SSID). ESS can be applied in virtual private networks that are deployed, for example, in various office, plant, warehouse, and/or other applicable scenarios for the ease of STA management. Virtual BSS group identifier therefore can be an ESS identifier, such as an ESSID, SSID, compressed ESSID, compressed SSID, or ESS color used to distinguish a particular ESS from other ESS(s).

Exemplary Actions of an STA

Figure 7:
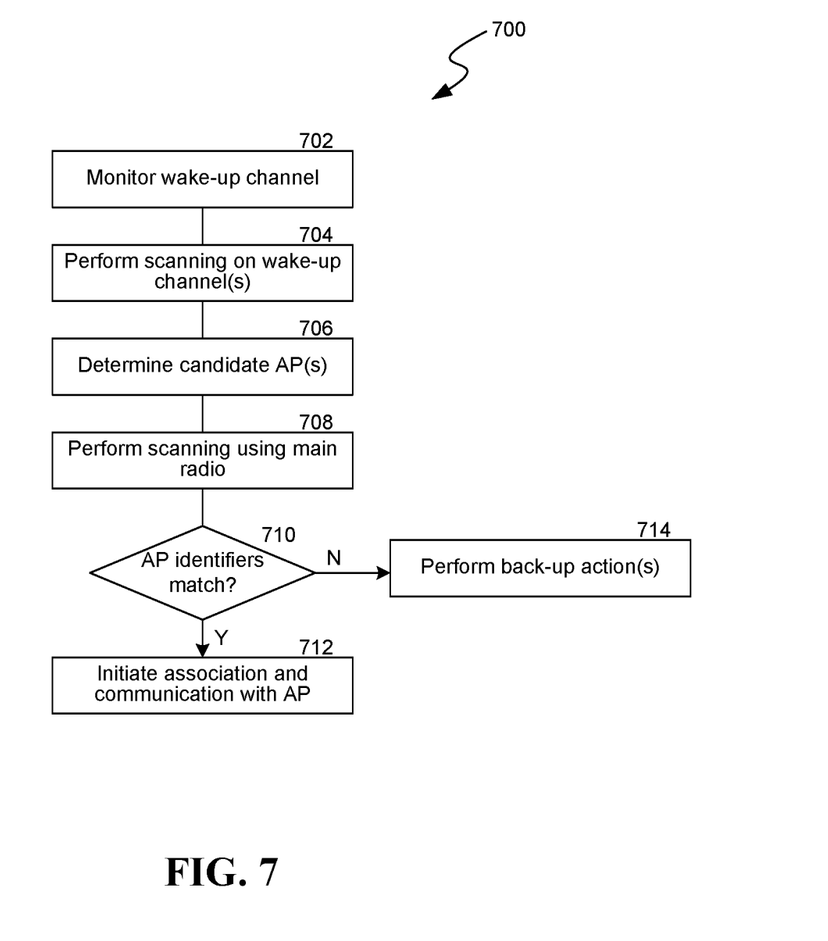
FIG. 7 is a flowchart of an enhanced process 700 for an STA in power-saving mode to wake up, in accordance with some embodiments of the currently disclosed technology.

FIG. 7 is a flowchart of an enhanced process 700 for an STA in power saving mode to wake up, in accordance with some embodiments of the currently disclosed technology.

At block 702, an STA in power saving mode monitors a wake-up channel designated by its associated AP for wake-up frames transmitted from its associated AP. Wake-up frames can be addressed specifically to the STA, addressed to a group of which the STA is a member, or a broadcast wake-up frame. The wake-up frame can take the form of a wake-up signal to wake up the STA, a wake-up signal carrying network selection information, or a wake-up Beacon.

Information carried by a wake-up frame can include identifier(s) of the transmitter that transmitted the wake-up frame, virtual BSS group identifier(s), wake-up parameters set(s), and/or wake-up parameter update set(s). At least a portion of the information can be placed in an outer, frontal, or otherwise easily-accessible part (e.g., the Physical Layer) of the frame, so that a receiving STA can efficiently filter out the frame if the frame is inapplicable to the receiving STA or if the reception of the frame is not intended.

At block 704, the STA starts to perform scanning on one or more wake-up channels. In some embodiments, the STA starts to perform scanning if one or more predefined conditions are satisfied. For example, the STA maintains a timer to calculate the duration between two successive wake-up frames that include the transmitter address or other identifier (s) of its associated AP. If the STA has not received any wake-up frame with certain identifier(s) of its associated AP for a threshold duration, the STA starts to perform scanning on one or more wake-up channels. In another example, if the RSS of the currently associated AP drops below a threshold, the STA starts to perform scanning on one or more wake-up channels. In some embodiments, when certain predefined conditions are met, instead of or in parallel with the scanning of the wake-up channel(s), the STA turns on its main radio to perform network scanning following scanning procedures known to those skilled in the art.

In some embodiments, the STA performs scanning on one or more wake-up channels in response to its wake-up radio being turned on. Illustratively, the STA can scan accessible wake-up channels sequentially, for example, from the lowest center frequency to the highest center frequency (or vice versa). The timing and duration that the STA stays on certain wake-up channel(s) can be determined by the associated AP or the STA, or be negotiated between the two. Thus the AP has sufficient information for determining when the STA can receive certain wake-up frame on certain wake-up channel (s) designated to the STA, and can send such wake-up frame on demand or in accordance with a schedule.

The one or more wake-up channels for scanning can be determined from wake-up parameters set(s) and/or wake-up parameter update set(s) included in one or more types of frames received by the STA. Such frame(s) can be sent from the associated AP or any unassociated AP(s). In some embodiments, the STA scans the wake-up channel(s) located within the primary channel and/or secondary channel(s) of its associated AP. In some embodiments, the STA scans wake-up channel(s) in all accessible primary channel(s) and/or secondary channel(s). In some embodiments, the STA only scans wake-up channel(s) assigned to the STA. In some embodiments, the STA scans wake-up channel(s) located outside of the primary channel and secondary channel(s) assigned to the STA.

Illustratively, the STA scans a wake-up channel by receiving and decoding wake-up frames using at least the wake-up radio of the STA. Based on the scanning of one or more wake-up channels, the STA obtains information carried by wake-up frames that are received via the one or more wake-up channels.

At block 706, the STA determines candidate AP(s) for initiating association and data communication. Illustratively, the STA can obtain (1) identifier(s) of transmitter of the received wake-up frame(s), and/or (2) virtual BSS group identifier(s) in the received wake-up frame(s).

In some embodiments, if the wake-up frame(s) received by the wake-up radio (and/or frame(s) previously received by the main radio before the STA entered power-saving mode) does not provide any identifying information on recommended AP(s), neighboring AP(s), or currently unassociated AP(s) in the same virtual BSS group of the STA (e.g., the wake-up frame(s) does not carry one or more corresponding wake-up parameters sets), the STA can determine at least a subset of the identifiers in (1) and/or (2) that identify or otherwise indicate one or more APs different from the AP currently associated with the STA. The STA can label the subset as candidate AP(s).

In some embodiments, if wake-up frame(s) received by the wake-up radio (and/or frame(s) previously received by the main radio before the STA entered power-saving mode) provides identifying information on recommended AP(s), neighboring AP(s), or currently unassociated AP(s) in the same virtual BSS group of the STA (e.g., the wake-up frame(s) carries one or more corresponding wake-up parameters sets), the STA can determine at least a subset of the identifiers in (1) and/or (2) that correspond to the recommended AP(s), neighboring AP(s), or currently unassociated AP(s) in the same virtual BSS group of the STA. The STA can label the subset as candidate AP(s). In these embodiments, the STA can also include any other AP that has been identified as a transmitter of a wake-up frame (e.g., a wake-up Beacon) received during a recent period of time.

If a virtual BSS group identifier is carried in a wake-up frame, the STA may prefer to choose a candidate AP within the same virtual BSS group of its currently associated AP. For example, in a private network of a warehousing system, many freight companies can use a same warehouse. A plurality of APs of an individual company can form a separate ESS for the ease of management. An STA may prefer to choose a candidate AP within the same ESS of its currently associated AP for convenience and efficiency (e.g., the ESS may support fast BSS transition for the STA).

At block 708, the STA turns on its main radio for further scanning. As described above and understood by those skilled in the art, the main radio scanning can be passive or/or active. The channel(s) to be scanned using the STA's main radio can include the candidate AP(s)' primary channel (s), communication channel(s) whose bandwidth encompasses or otherwise accommodates the candidate AP(s)'s wake-up channel(s), and/or neighboring channel(s) of the same.

By performing scanning using the main radio, the STA receives Beacons, Probe Response, and/or other frames on each scanned channel. The STA can decode the received frames to obtain AP identifying information (e.g., wake-up parameters set) carried by the frames.

At block 710, the STA determines whether one or more AP identifiers obtained through main radio scanning match that of the candidate AP(s). For example, in some embodiments, the identifier(s) of transmitter in a wake-up frame transmitted by an AP is also included in a wake-up parameters set carried by a Beacon, Probe Response, and/or other frames transmitted by the same AP. Therefore, once the STA decodes or otherwise obtains the identifier(s) of transmitter in a frame (e.g., Beacon or Probe Response) received via main radio scanning, the STA can compare the obtained identifier(s) of transmitter with one or more of candidate APs' identifier(s) obtained from wake-up frame(s) during wake-up channel scanning.

If the STA finds one or more matches based on the comparison, at block 712, the STA selects a target AP from the matched APs and initiates association (e.g., authentication, parameter exchange, and/or other actions) with the selected target AP. Illustratively, the STA can achieve this using a MAC address decoded or otherwise obtained in a Beacon, Probe Response, or other frames transmitted by the target AP. In some embodiments, the STA selects the target AP based, at least in part, on the capacity, capability, configuration, and/or the RSS of the AP as compared with other matched AP(s). Once the association is complete, the STA can initiate data communication with the target AP via the main radio.

If the STA cannot find a match between AP identifier(s) obtained through the main radio scanning and that of any candidate AP, at block 714, the STA performs one or more back-up actions. For example, the STA can perform wake-up channel scanning using its wake-up radio for another period of time. Alternatively or in addition, the STA can perform a typical, complete scanning on all accessible channels using its main radio based on current scanning procedures known to those skilled in the art.

EXAMPLES OF USE CASES

Figure 6:
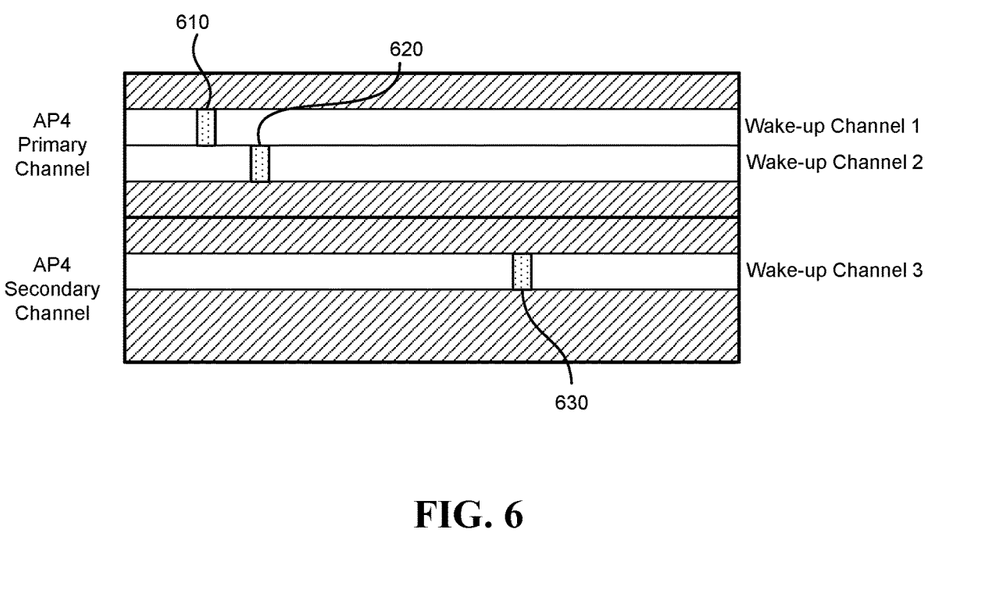
FIG. 6 illustrates a use case example, in accordance with some embodiments of the presently disclosed technology.

FIG. 6 illustrates a use case example, in accordance with some embodiments of the presently disclosed technology. As illustrated in FIG. 6, 4 APs (i.e., AP1, AP2, AP3, and AP4) each sets up an individual BSS. The 4 BSS's are grouped into two virtual BSS groups. The first virtual BSS group includes AP1 and AP4. The second virtual BSS group includes AP2 and AP3. Within each virtual BSS group, different BSS colors can be used to identify different member APs.

As illustrated, AP4 has a primary channel and a secondary channel, and has three wake-up channels each located in the primary channel or secondary channel, respectively. An STA is associated with AP4 and enters power-saving mode. AP4 broadcasts wake-up parameters set about itself in one or more Beacon frames. AP4 allocates wake-up channel 1 to the STA, so that the STA can monitor, on wake-up channel 1, wake-up frames including wake-up signal, wake-up Beacon, or wake-up signal that carries network selection information.

When the STA has not received a wake-up Beacon from AP4 for a threshold number of wake-up Beacon intervals, or once the STA enters power-saving mode, the STA starts scanning on wake-up channels. In some embodiments, the STA can scan wake-up channel 1 and receive AP1's wake-up Beacon 610 that includes AP1's identifier(s) (e.g., a distinct BSS color or other BSS identifier of AP1) and AP1's virtual BSS group ID (e.g., a distinct ESS ID identifying the first virtual BSS group).

In some embodiments, the STA can scan all the wake-up channels in a primary channel where the STA's currently designated wake-up channel (i.e., wake-up channel 1) is located. In the example of FIG. 6, these wake-up channels correspond to wake-up channels 1 and 2 located in AP4's primary channel. By scanning these wake-up channels, the STA can receive AP1's wake-up Beacon 610 and a wake-up signal 620 sent by AP2. The wake-up signal 620 can include AP2's identifier(s) and/or AP2's virtual BSS group ID.

In some embodiments, the STA can scan all the wake-up channels of its associated AP (i.e., AP4). In the example of FIG. 6, the STA can scan wake-up channels 1, 2, and 3, and receive AP1's wake-up Beacon 610, AP2's wake-up signal 620, and AP3's wake-up Beacon 630. Wake-up Beacon 630 can include AP3's identifier(s) and/or AP3's virtual BSS group ID.

Suppose the STA only scans wake-up channel 1 and wake-up channel 2, the STA can select AP1 in the same virtual BSS group of AP4, as a candidate AP. The STA then turns on its main radio to perform scanning on the primary channel and/or secondary channel of AP4 to obtain AP1's Beacon or Probe Response frame. If the location of AP1's primary channel is indicated in AP1's wake-up Beacon 610, the STA performs scanning on AP1's primary channel to obtain AP1's Beacon or Probe Response frame.

In some embodiments, the identifier(s) of transmitter used in wake-up frames transmitted by an AP may be different from those used in non-wake-up frames (e.g., frames transmitted via primary channels) transmitted from the same AP. However, AP1 carries BSS identifier(s) and virtual BSS group identifier(s) in Beacon or Probe Response frames. For example, a wake-up element of the Beacon or Probe Response frame is used to contain wake-up parameters set(s), which includes the BSS identifier(s) (e.g., BSS color) and/or virtual BSS group identifier(s) (e.g., ESS ID) used by AP1 in its wake-up frames.

Once the STA receives a Beacon or Probe Response frame that includes BSS identifier(s) and/or virtual BSS group identifier(s) identical with that of AP1's wake-up frame, the STA decodes or otherwise obtains the MAC address contained in the transmitter address field of the received Beacon or Probe Response frame. Then the STA starts association with AP1 using the MAC address, for example, by transmitting authentication request(s) with the MAC address in the receiver address field. If the association is successful, the STA starts data communication with AP1.

Figure 8:
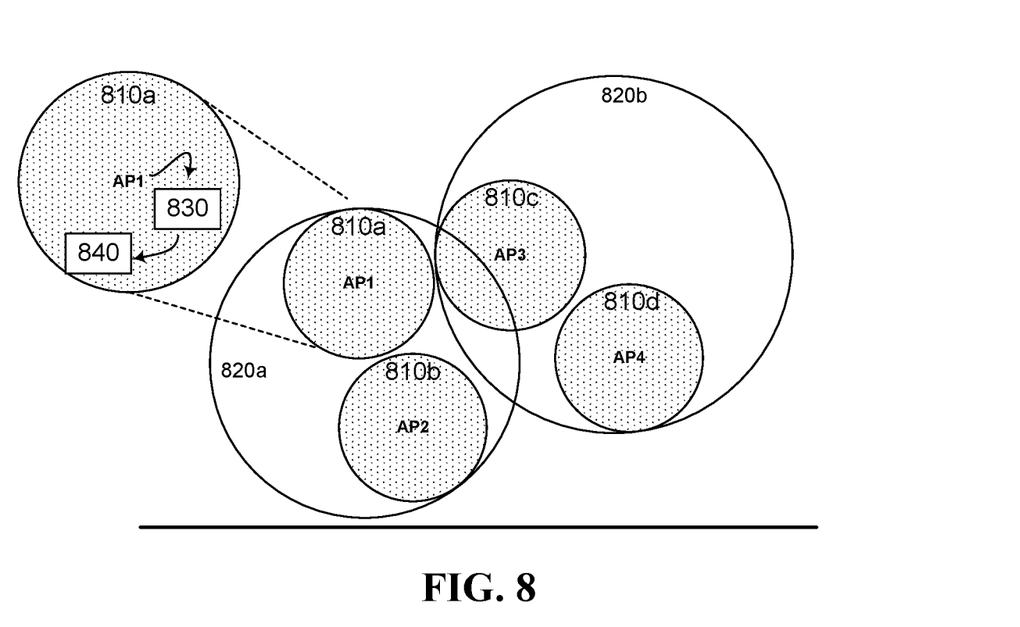
FIGS. 8 and 9 illustrate another use case example, in accordance with some embodiments of the presently disclosed technology.
Figure 9:
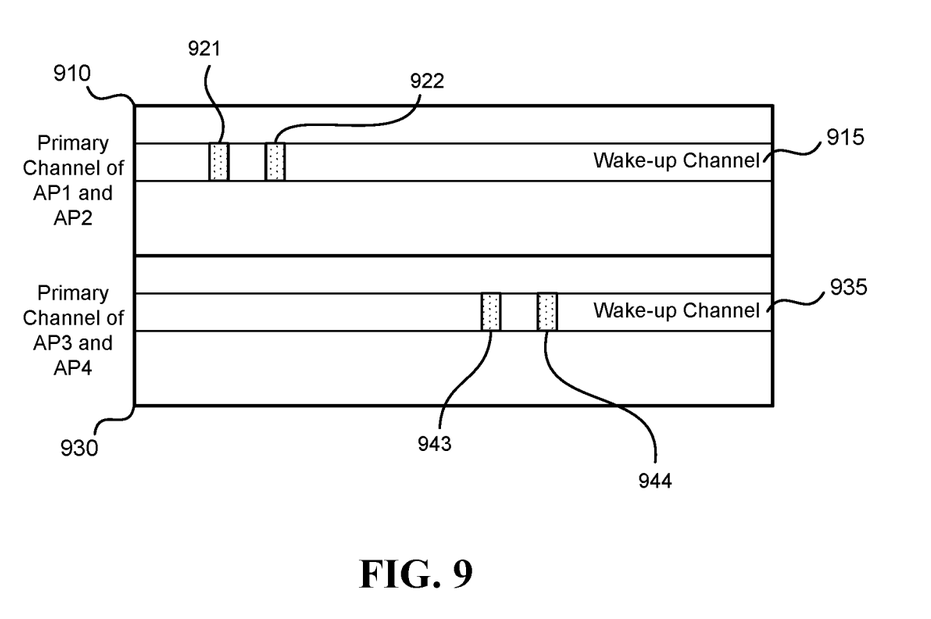

FIGS. 8 and 9 illustrate another use case example, in accordance with some embodiments of the presently disclosed technology. As illustrated in FIG. 8, 4 APs (i.e., AP1, AP2, AP3, and AP4) each sets up an individual BSS 810. The 4 BSS's are grouped into two virtual BSS groups. The first virtual BSS group 820a includes AP1 and AP2. The second virtual BSS group 820b includes AP3 and AP4. Within each virtual BSS group, different BSS colors can be used to identify different member APs.

As shown in FIG. 8, AP1 broadcasts wake-up parameters set 830 in its Beacon frame(s) to a STA 840 associated with AP1. Besides the AP1's wake-up parameters set 830, AP2's and AP3's wake-up parameters sets are also carried by AP1's Beacon frame(s). In this case, AP2's wake-up parameters set is included because AP2 is within the same virtual BSS group of AP1, and AP3 is a neighboring AP recommended to STAs associated with AP1. In particular, AP1's wake-up parameters set 830 includes: the location of the wake-up channel used by AP1, the BSS color or other BSS identifier(s) used by AP1 in its wake-up frames, the virtual BSS group identifier(s) of AP1. AP2's wake-up parameters set includes: the location of the wake-up channel used by AP2, the BSS color or other BSS identifier(s) used by AP2 in its wake-up frames, the virtual BSS group identifier(s) of AP2, and the location of the primary channel of AP2. By receiving the Beacon transmitted from AP1, an STA 840 associated with AP1 can obtain information included in the wake-up parameters set of AP1, AP2, and AP3, respectively.

AP1 has a wake-up channel 915 located in its primary channel 910. An associated STA entering power saving mode monitors the wake-up channel 915 for wake-up frames. In some embodiments, AP1 can send wake-up parameters set(s) in its wake-up frames. For example, AP1 can send a wake-up Beacon 921 carrying wake-up parameters set(s) of AP2 and/or AP3. As another example, AP1 can send a wake-up signal with network selection information that carries wake-up parameters set(s) of AP1, AP2, and/or AP3. Therefore, the associated STA can obtain corresponding wake-up parameters from wake-up frames received on the wake-up channel 915.

The STA performs wake-up channel scanning using its wake-up radio. The STA can receive AP2's wake-up Beacon 922 on AP2's wake-up channel 915. It can also switch to AP3's wake-up channel 935 and receive AP3's wake-up Beacon 943 and AP4's wake-up Beacon 944. By comparing (a) the BSS colors (or other applicable BSS identifiers) of AP2 and AP3 that were obtained through previously received wake-up parameters set(s) with (b) the identifier(s) of transmitter of the wake-up frames received during wake-up channel scanning, the STA can identify and process AP2 and AP3's wake-up Beacon frames. The frame identifying process can include, for example, filtering out wake-up frames (e.g., AP4's wake-up Beacon 944) transmitted by other AP(s). The STA can label AP2 and AP3 as candidate APs.

The STA then turns on its main radio to perform scanning using its main radio on AP2's primary channel 910 and AP3's primary channels 930. The STA can receive multiple Beacons frames on these primary channels during the scanning. The STA can compare the BSS color (or another applicable BSS identifier) included in the wake-up parameter set of the received Beacon frames with one or more candidate AP's BSS color (or another applicable BSS identifier) used in the candidate AP's wake-up frames. Once match(es) is found based on the comparison, the STA processes the matched Beacon(s) and selects a target AP (e.g., AP2 or AP3) based on its capability, capacity, configuration, and/or signal strength. The STA then initiates association and data communication with the target AP.

Alternatively or in addition, in some embodiments, the STA can select a target AP based on the wake-up radio scanning. Illustratively, the wake-up Beacon frames of AP2 and AP3 that have been received by the STA can indicate signal strength and can include information regarding the transmitting AP's capability, capacity, and/or configuration, which can be processed by the STA for selecting the target AP. Suppose the STA selects AP2 as the target AP, the STA can turn on its main radio and perform scanning on AP2's primary channel(s). The STA may receive multiple Beacons on the primary channel(s) during scanning, and it can compare (a) the BSS color (or another applicable BSS identifier) included in the wake-up parameters set of the received Beacons with (2) AP2's BSS color (or another applicable BSS identifier) used in AP2's wake-up frames. Once a match is found based on the comparison, the STA processes the matched Beacon, and initiates association and data communication with the AP2 based thereon.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communication, comprising:
receiving, by a recipient communication node via a first channel associated with a first source communication node, at least one first message including multiple sets of parameters,
wherein each set of parameters is associated with one of a plurality of source communication nodes configured to communicate with the recipient communication node,
wherein each set of parameters includes a parameter that identifies a wake-up channel associated with the one of the plurality of source communication nodes,
wherein the plurality of source communication nodes includes the first source communication node or a second source communication node;
performing scanning on one or more wake-up channels, wherein one or more durations when the recipient communication node stays on the one or more wake-up channels is determined by the first source communication node; and
initiating communication, based on the scanning and via at least a second channel, with the second source communication node based on the at least one first message received via the first channel,
wherein the second channel is indicated in a set of parameters for the first source communication node or the second source communication node in the at least one first message.

2. The method of claim 1, further comprising:
receiving, via the second channel, at least one second message transmitted from the second source communication node, wherein the at least one second message includes at least one identifier that identify the second source communication node.

3. The method of claim 2, wherein the at least one identifier includes a compressed service set identifier (SSID).

4. The method of claim 1, wherein each set of parameters includes another parameter that indicates a Basic Service Set Identifier (BSSID) of the one of the plurality of source communication nodes.

5. The method of claim 1, wherein the at least one first message is included in a beacon frame or a probe response frame received by the recipient communication node.

6. The method of claim 1, wherein the first channel corresponds to a primary channel associated with the first source communication node.

7. A method for wireless communication, comprising:
transmitting, by a first source communication node via a first channel to a recipient communication node, at least one message including multiple sets of parameters,
wherein each set of parameters is associated with one of a plurality of source communication nodes configured to communicate with the recipient communication node,
wherein each set of parameters includes a parameter that identifies a wake-up channel associated with the one of the plurality of source communication nodes,
wherein the plurality of source communication nodes includes the first source communication node or a second source communication node,
wherein a second channel is indicated in a set of parameters for the second source communication node in the at least one message; and
wherein the first source communication node determines one or more durations when the recipient communication node stays on one or more wake-up channels.

8. The method of claim 7, wherein the first channel corresponds to a primary channel associated with the first source communication node.

9. The method of claim 7, wherein each set of parameters includes another parameter that indicates a Basic Service Set Identifier (BSSID) of the one of the plurality of source communication nodes.

10. The method of claim 7, wherein the at least one first message is included in a beacon frame or a probe response frame transmitted by the first source communication node.

11. A wireless communication apparatus, comprising:
a processor configured to:
receive, by a recipient communication node via a first channel associated with a first source communication node, at least one first message including multiple sets of parameters,
wherein each set of parameters is associated with one of a plurality of source communication nodes configured to communicate with the recipient communication node,
wherein each set of parameters includes a parameter that identifies a wake-up channel associated with the one of the plurality of source communication nodes,
wherein the plurality of source communication nodes includes the first source communication node or a second source communication node;
perform scan on one or more wake-up channels, wherein one or more durations when the recipient communication node stays on the one or more wake-up channels is determined by the first source communication node; and initiate communication, based on the scanning and via at least a second channel, with the second source communication node based on the at least one first message received via the first channel,
wherein the second channel is indicated in a set of parameters for the first source communication node or the second source communication node in the at least one first message.

12. The apparatus of claim 11, wherein the processor is further configured to:

receive, via the second channel, at least one second message transmitted from the second source communication node, wherein the at least one second message includes at least one identifier that identify the second source communication node.

13. The apparatus of claim 12, wherein the at least one identifier includes a compressed service set identifier (SSID).

14. The apparatus of claim 11, wherein each set of parameters includes another parameter that indicates a Basic Service Set Identifier (BSSID) of the one of the plurality of source communication nodes.

15. The apparatus of claim 11, wherein the at least one first message is included in a beacon frame or a probe response frame received by the recipient communication node.

16. The apparatus of claim 11, wherein the first channel corresponds to a primary channel associated with the first source communication node.

17. A wireless communication apparatus, comprising:
a processor configured to:
transmit, by a first source communication node via a first channel to a recipient communication node, at least one message including multiple sets of parameters,
wherein each set of parameters is associated with one of a plurality of source communication nodes configured to communicate with the recipient communication node,
wherein each set of parameters includes a parameter that identifies a wake-up channel associated with the one of the plurality of source communication nodes,
wherein the plurality of source communication nodes includes the first source communication node or a second source communication node,
wherein a second channel is indicated in a set of parameters for the second source communication node in the at least one message; and
wherein the first source communication node determines one or more durations when the recipient communication node stays on one or more wake-up channels.

18. The apparatus of claim 17, wherein the first channel corresponds to a primary channel associated with the first source communication node.

19. The apparatus of claim 17, wherein each set of parameters includes another parameter that indicates a Basic Service Set Identifier (BSSID) of the one of the plurality of source communication nodes.

20. The apparatus of claim 17, wherein the at least one first message is included in a beacon frame or a probe response frame transmitted by the first source communication node.

* * * * *

UNITED STATES PATENT AND TRADEMARK OFFICE
CERTIFICATE OF CORRECTION

PATENT NO. : 11,240,714 B2
APPLICATION NO. : 16/826143
DATED : February 1, 2022
INVENTOR(S) : Nan Li et al.

It is certified that error appears in the above-identified patent and that said Letters Patent is hereby corrected as shown below:

In the Specification

In Column 3, Line 50, delete "continue" and insert -- continues --, therefor.

In Column 3, Line 54, delete "channel" and insert -- channels --, therefor.

In Column 5, Line 36, delete "including least" and insert -- including at least --, therefor.

In Column 6, Line 52, delete "can a" and insert -- can --, therefor.

In Column 6, Line 56, delete "an a" and insert -- a --, therefor.

In Column 11, Line 33, delete "channels" and insert -- channel --, therefor.

In Column 12, Line 18, delete "more them." and insert -- more of them. --, therefor.

Signed and Sealed this
Tenth Day of May, 2022

Katherine Kelly Vidal
*Director of the United States Patent and Trademark Office*